Oct. 29, 1929.                    C. A. LANDER                    1,733,350
                                  ANIMAL TRAP
                              Filed April 5, 1928
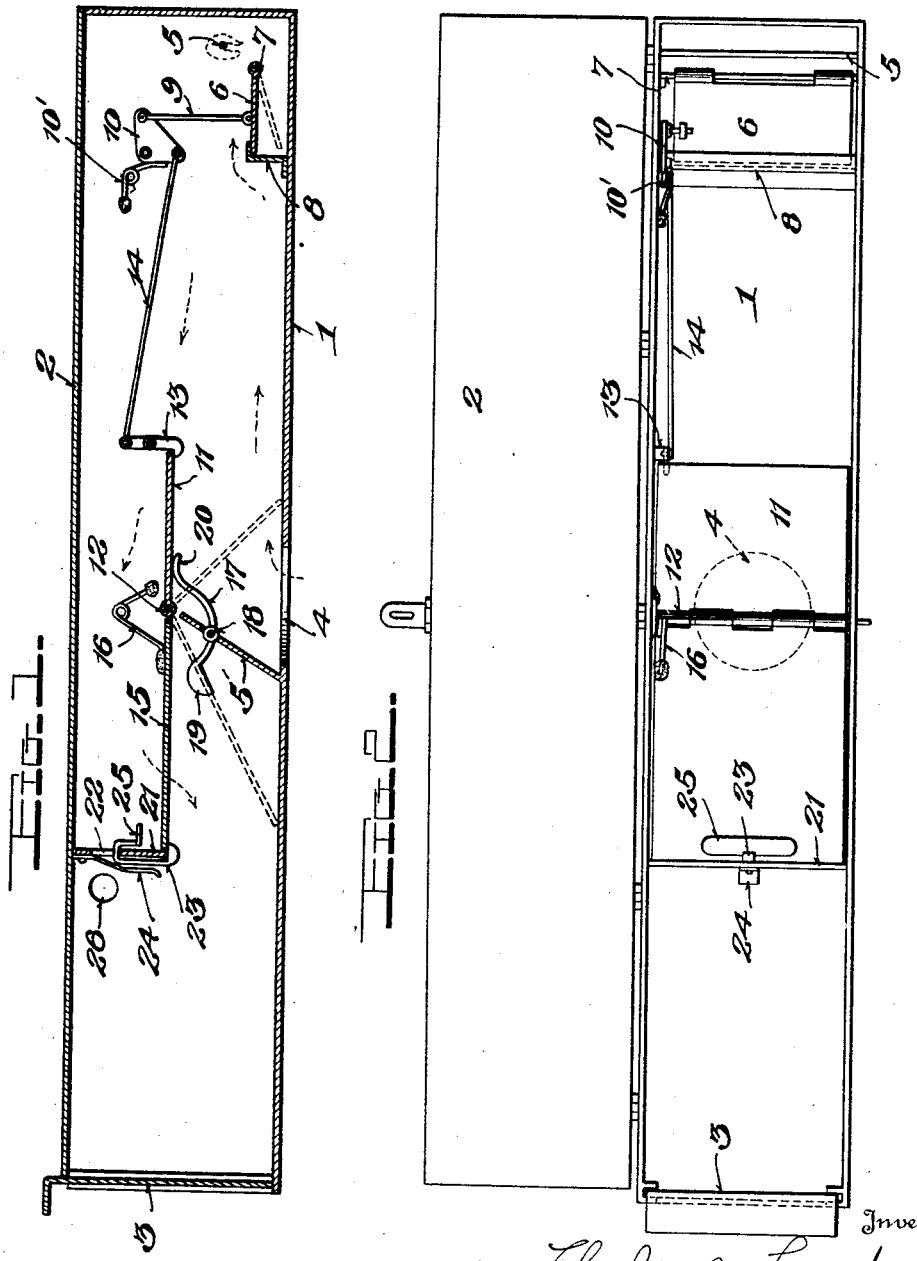
Inventor
Chesley A. Lander
By A. W. Freeman,
                Attorney Patented Oct. 29, 1929

1,733,350

UNITED STATES PATENT OFFICE

CHESLEY A. LANDER, OF MADISON, SOUTH DAKOTA

ANIMAL TRAP

Application filed April 5, 1928. Serial No. 267,773.

This invention relates to animal traps, and the primary object thereof is to provide a self-setting trap which is of simple and economical construction and which is reliable in operation.

The invention has further and other objects which will be later set forth and manifested in the course of the following description.

In the drawings:—

Fig. 1 is a longitudinal sectional view of the invention, and

Fig. 2 is a top plan view with the cover open.

The invention includes a housing having a bottom 1 and a hinged top 2, and preferably has a sliding door 3 at one end to release the trapped animals. An inlet 4 is provided in the bottom so that the trap can be placed over a rat hole for example, and has a partition 5' extending transversely across the housing and located at one side of the inlet 4. The opposite end of the housing has a bait holding rod 5, adjacent which is a platform 6 pivoted at its rear at 7. A stop member 8 limits upward movement of the platform 6 the latter being connected by a rod 9 to a bell crank lever 10, the lever being pivoted to a side of the housing and being tensioned by a spring 10'. A second platform 11 is pivoted to a rod 12 connected to the housing and is engaged at its outer end by a pivoted latch 13 which latter is connected to and released by a rod 14 which in turn is pivoted to the lever 10. A third platform 15 is pivoted to the rod 12 and is normally held in raised position by a spring 16 having a coil between its ends, the spring being secured at one end to platform 15 and at its opposite end to a side of the housing. An arm 17 is pivoted intermediate its ends at 18 to the partition 5' and has a weighted end 19, its opposite end 20 being engaged with the platform 11. A transverse partition 21 is secured to the housing and has a light receiving opening 22 and foot receiving latch 23 the latter tensioned by a spring 24.

The latch 23 is engageable with the outer end of the platform 15 to hold the latter in normal set position while the latch is provided with a foot engaging part 25 located at a distance above the platform 15. A light inlet 26 is formed in a side of the housing so as to convey light to the opening 22.

In operation the animal enters the inlet 4 and is attracted by the bait on the holder 5 and in attempting to reach same, steps on the platform 6, depressing the latter, the depression of the platform through the rod 9, lever 10 and rod 14 releasing catch 13, which causes platform 11 to descend to the dotted line position of Fig. 1, thereby cutting off escape of the animal through inlet 4. The animal in attempting to escape then climbs up the platform 11 onto platform 15 and being attracted by the light through the opening 22 and in order to reach the latter, places his feet on the element 25 thereby releasing the latch 23 and causing the platform 15 to descend to the dotted line position of Fig. 1, whereby it will be seen that the animal is trapped and cannot reach the inlet 4 due to the partition 5'. Upon depression of the platform 15, same engages the outer end 19 of the arm 17 and depresses said end 19 causing the end 20 thereof to raise the platform 11 to normal position in which it is again engaged with and held by the latch 13. As soon as the platform 15 is released of the weight of the animal, the spring 16 thereof restores same to its normal latched or set position.

From the foregoing it will be seen that the trap is self and ever setting and provides a simple and positive means for trapping the animal.

What is claimed is:—

1. In a trap, a housing having a bottom provided with an inlet opening between its ends, a bait holder at one end of the housing, a platform pivoted at its rear adjacent the bait holder, means carried by the housing and engageable with the front of the platform to limit upward movement of the latter, a pivoted bell-crank above the platform, a rod pivoted to the bell-crank and to the platform, a pair of platforms pivoted at their inner ends at a point above the inlet so that same can move downwardly against the housing bottom and on opposite sides of the inlet, a latch for the outer end of each of the pair of platforms, a rod pivoted to the latch adjacent the bell-crank and to the latter, a spring connected to one of the platforms of said pair of platforms to restore same to normal position, a pivoted weighted arm engageable with the under face of the first platform of said pair to actuate the other platform of said pair to restore the latter to normal position, animal foot engaging means connected to the latch of the first named platform of the pair, and a partition in the housing having a light receiving opening associated with the last named catch.

2. An animal trap including a housing having an inlet between its ends, a bait holder at one end of the housing, a pivoted platform movable to extend over said inlet, a latch for the platform, animal operated means adjacent the bait holder connected to the latch to release same, a second pivoted spring tensioned platform adjacent the first platform, an arm pivoted between its ends and operable by depression of the second platform to move the first platform to normal position, and an animal operated latch for the second platform.

3. An animal trap including a housing having an inlet, a bait holder spaced from the inlet, a pivoted platform movable to cut-off the inlet, a latch for the platform, a depressible animal operated means adjacent the bait, a bell-crank connected to the latch and to the depressible means, a second pivoted spring tensioned platform adjacent the first platform, means actuated by depression of the second platform to move the first platform to normal position, and animal operated means to latch the second platform.

4. An animal trap including a housing having an inlet and having a partition spaced from the inlet to form an animal holding compartment between the partition and an end of the housing, means to cut-off the inlet, animal actuated means to operate the cut-off means, an animal operated element for said compartment located adjacent the upper end of the partition for controlling ingress and egress to the compartment, means to restore said element to normal closed position following operation thereof, and means operated by the element to restore the cut-off means to normal position by the closing movement of the element.

5. An animal trap including a housing having an inlet and having an animal holding compartment spaced from the inlet, means to cut-off the inlet, means to latch said cut-off means in normal position, animal actuated means to release the latching means, a depressible element for said compartment for controlling ingress to and egress therefrom, means to latch said element in normal position, means to restore said element to normal position following actuation thereof, and means operable by and upon depression of said depressible element to restore said cut-off means to normal latched position.

6. An animal trap including a housing having an inlet and having an animal holding compartment spaced from the inlet, means to cut-off the inlet, means to latch said cut-off means in normal position, animal actuated means to release the latching means, a depressible element for said compartment for controlling ingress to and egress therefrom, means to latch said element in normal position, a partition adjacent to the free end of the depressible element having a light opening therein, animal actuated means for releasing said element, disposed adjacent to said light opening, and means operable by and upon depression of said depressible element to restore said cut-off means to normal latched position.

In testimony whereof I affix my signature.

CHESLEY A. LANDER.